US009280601B1

(12) United States Patent
Liu et al.

(10) Patent No.: US 9,280,601 B1
(45) Date of Patent: Mar. 8, 2016

(54) MODIFYING SEARCH RESULTS

(71) Applicant: Google Inc., Mountain View, CA (US)

(72) Inventors: Sean Yaoxing Liu, Sunnyvale, CA (US); David Yen, San Francisco, CA (US); Sanghoon Cha, Fort Lee, NJ (US); Sagar Kamdar, Redwood City, CA (US); Andrew Hyatt, Forest Hills, NY (US); Kumar Mayur Thakur, West Orange, NJ (US); Yihua Wu, Princeton Junction, NJ (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 13/767,827

(22) Filed: Feb. 14, 2013

Related U.S. Application Data

(60) Provisional application No. 61/599,395, filed on Feb. 15, 2012.

(51) Int. Cl.
*G06F 17/30* (2006.01)

(52) U.S. Cl.
CPC .... *G06F 17/30864* (2013.01); *G06F 17/30554* (2013.01)

(58) Field of Classification Search
None
See application file for complete search history.

(56) References Cited

U.S. PATENT DOCUMENTS

| 6,252,597 B1 | 6/2001 | Lokuge |
| 6,535,888 B1 | 3/2003 | Vijayan et al. |
| 6,594,670 B1 | 7/2003 | Genser |
| 6,598,043 B1 | 7/2003 | Baclawski |
| 6,665,836 B1 | 12/2003 | Wynblatt et al. |
| 6,758,394 B2 | 7/2004 | Maskatiya et al. |
| 6,763,351 B1 | 7/2004 | Subramaniam et al. |
| 6,785,670 B1 | 8/2004 | Chiang et al. |
| 6,961,731 B2 | 11/2005 | Holbrook |
| 7,039,875 B2 | 5/2006 | Khalfay et al. |
| 7,076,743 B2 | 7/2006 | Ingram et al. |
| 7,162,493 B2 | 1/2007 | Weiss et al. |
| 7,228,506 B2 | 6/2007 | Ivanovic et al. |
| 7,299,222 B1 | 11/2007 | Hogan et al. |
| 7,493,315 B2 | 2/2009 | Holbrook |

(Continued)

FOREIGN PATENT DOCUMENTS

| WO | 02/019172 | 3/2002 |
| WO | 2006/001920 | 1/2006 |
| WO | 2007/059503 | 5/2007 |

OTHER PUBLICATIONS

International Search Report and Written Opinion dated May 2, 2007 (13 pages total).

(Continued)

*Primary Examiner* — Hung Q Pham
(74) *Attorney, Agent, or Firm* — Fish & Richardson P.C.

(57) ABSTRACT

Systems and methods for generating search results are provided. In some aspects, a method includes receiving a query, obtaining a search result that is responsive to the query, obtaining content from a social networking service that is responsive to the query and related to the search result, modifying the search result to include a first portion associated with the content from the social networking service, providing for display the modified search result and an interface component for receiving a request for interacting with the content, and modifying the search result to include a second portion of the content and to provide an interface to facilitate an interaction, in response to receiving a request for interacting with the content.

17 Claims, 12 Drawing Sheets

(56) References Cited

U.S. PATENT DOCUMENTS

| | | | |
|---|---|---|---|
| 7,725,405 B2 | 5/2010 | Johnson | |
| 8,041,709 B2 | 10/2011 | Permandla et al. | |
| 8,073,830 B2 | 12/2011 | Fontes et al. | |
| 8,255,381 B2 | 8/2012 | Fontes et al. | |
| 8,650,210 B1* | 2/2014 | Cheng et al. | 707/770 |
| 2002/0010623 A1 | 1/2002 | Mccollom et al. | |
| 2002/0042799 A1 | 4/2002 | Slotznick | |
| 2002/0118214 A1 | 8/2002 | Card et al. | |
| 2002/0133566 A1 | 9/2002 | Teeple | |
| 2002/0194162 A1 | 12/2002 | Rios et al. | |
| 2003/0046259 A1 | 3/2003 | Manrique et al. | |
| 2003/0053091 A1 | 3/2003 | Tanaka et al. | |
| 2003/0146937 A1 | 8/2003 | Lee | |
| 2003/0146939 A1 | 8/2003 | Petropoulos et al. | |
| 2003/0169293 A1 | 9/2003 | Savage | |
| 2004/0017393 A1 | 1/2004 | Easwar | |
| 2004/0090464 A1 | 5/2004 | Shake et al. | |
| 2004/0203854 A1 | 10/2004 | Nowak | |
| 2004/0205638 A1 | 10/2004 | Thomas et al. | |
| 2004/0205715 A1 | 10/2004 | Taylor | |
| 2004/0225922 A1 | 11/2004 | Susarla et al. | |
| 2005/0144158 A1 | 6/2005 | Capper et al. | |
| 2005/0240391 A1 | 10/2005 | Lekutai | |
| 2005/0261891 A1 | 11/2005 | Chan et al. | |
| 2005/0278314 A1 | 12/2005 | Buchheit | |
| 2006/0048051 A1 | 3/2006 | Lazaridis | |
| 2006/0059418 A1 | 3/2006 | Elkady | |
| 2006/0069670 A1 | 3/2006 | Khaliq et al. | |
| 2006/0074868 A1 | 4/2006 | Khaliq et al. | |
| 2006/0095424 A1 | 5/2006 | Petropoulos et al. | |
| 2006/0173824 A1 | 8/2006 | Bensky et al. | |
| 2006/0200455 A1 | 9/2006 | Wilson | |
| 2006/0200767 A1 | 9/2006 | Glaeske et al. | |
| 2006/0248078 A1 | 11/2006 | Gross et al. | |
| 2006/0294476 A1 | 12/2006 | Buckley | |
| 2008/0071739 A1 | 3/2008 | Kumar et al. | |
| 2009/0043689 A1 | 2/2009 | Yang et al. | |
| 2009/0307188 A1 | 12/2009 | Oldham et al. | |
| 2012/0110464 A1* | 5/2012 | Chen et al. | 715/738 |
| 2012/0110474 A1* | 5/2012 | Chen et al. | 715/753 |
| 2013/0036109 A1* | 2/2013 | Kulick et al. | 707/722 |
| 2013/0110802 A1* | 5/2013 | Shenoy et al. | 707/706 |
| 2013/0144868 A1* | 6/2013 | Ickman et al. | 707/722 |
| 2013/0179427 A1* | 7/2013 | Archambault et al. | 707/711 |
| 2013/0179428 A1* | 7/2013 | Archambault et al. | 707/711 |
| 2013/0198177 A1 | 8/2013 | Oldham et al. | |

OTHER PUBLICATIONS

International Preliminary Report on Patentability issued in corresponding international application No. PCT/US2007/065472, mailed Oct. 9, 2008, 7 pages.

International Preliminary Report on Patentability issued in corresponding international application No. PCT/US2006/060906, 8 pages.

European Search Report corresponding to EP 07 759 675 mailed Oct. 5, 2011, 7 pages.

Office Action from U.S. Appl. No. 11/394,192, dated Apr. 30, 2009, 18 pages.

Office Action from U.S. Appl. No. 11/394,192, dated Dec. 17, 2009, 14 pages.

Office Action from U.S. Appl. No. 11/394,192, dated Jul. 7, 2010, 20 pages.

Office Action from U.S. Appl. No. 11/394,192, dated Feb. 2, 2011, 25 pages.

Office Action from U.S. Appl. No. 12/084,957, dated Dec. 7, 2011, 49 pages.

Office Action from U.S. Appl. No. 12/084,957, dated May 8, 2012, 82 pages.

Office Action from U.S. Appl. No. 12/084,957, dated Oct. 15, 2012, 61 pages.

Office Action from U.S. Appl. No. 13/615,966 dated Oct. 29, 2013, 17 pages.

About.com: "Binoculars FAQ"; http://websearch.about.com; Mar. 22, 2006 (print date), 3 pages.

Browster: "Browse Search Results Instantly!" www.browster.com; Mar. 16, 2006 (print date), 8 pages.

Dan Farber: "Browsing at 2x Normal Speed"; http://blogs.zdnet.com/BTL; Feb. 14, 2005, 2 pages.

Dieberger et al., "Exploratory Navigation in Large Multimedia Documents using Context Lenses," Systems Sciences, 2001, Proceedings of the 35th Hawaii International Conference on System Sciences—Jan. 7, 2001, pp. 1462-1468 (7 pages total).

Jones et al.: "Interactive Document Summarisation Using Automatically Extracted Keyphrases"; Proceedings of the 35th Annual Hawaii International Conference on System Sciences; Jan. 7-10, 2001,10 pages.

Roberts et al., "Visual Bracketing for Web Search Result Visualization", Proceedings of Information Visualization (1V03), pp. 264-269, IEEE Computer Society, Jul. 2003.

Ulicny, Lycos Retriever: An Information Fusion Engine, Versatile Information System, Inc., 4 pages.

Xiaoming Li et al., "Search Engine: Principles, Techniques and Systems", Science Publishing House, Apr. 2005, 19 pages. (English description included).

OMA Open Mobile Alliance, OMA Release Program and Specifications, http://www.opetnnobilealliance.org/release_program/index.html, Copyright 2002, [retrieved from internet on Jun. 6, 2005], pp. 1-4.

OMA Open Mobile Alliance, OMA Enabler Releases and Specifications—OMA Browsing V2.3 Candidate Enabler, http://www.openmobilealliance.org/release_program/browsing_v23.html, Copyright 2002, [retrieved from internet on Jun. 6, 2005], pp. 1-2.

OMA Open Mobile Alliance, OMA Enabler Releases and Specifications—OMA User Agent Profile V2.0 Candidate Enabler, http://www.openmobilealliance.org/release_program/uap_v20.html, Copyright 2002, [retrieved from internet on Jun. 6, 2005], p. 1.

OMA Open Mobile Alliance, OMA Enabler Releases and Specifications—OMA Browser Protocol Stack 2.1 Candidate Enabler, http://www.openmobileailliance.org/release_program/browser_protocol_v21.html, Copyright 2002, [retrieved from internet on Jun. 6, 2005], pp. 1-2.

OMA Open Mobile Alliance, WV-040 System Architecture Model, Approved Version 1.2—Jan. 25, 2005, pp. 1-15.

OMA Open Mobile Alliance, User Agent Profile, http://www.openmobilealliance.org/copyright.html, Version 20—May 2003, pp. 1-47.

W@P Wireless Application Forum, WMLScript Specification, http://www.wapforum.org/docs/copyright.htm., Version 25—Oct. 2000, pp. 1-136.

OMA Open Mobile Alliance, OMA Service Environment, Approved Version 1.0—Sep. 7, 2004, pp. 1-32.

W@P Wireless Application Protocol Forum, Wireless Application Environment Defined Media Type Specification, http://www.wapforum.org/what/copyright.htm, Version 15—May 2001, pp. 1-13.

W@P, Wireless Application Protocol Forum, HTTP State Management Specification, http://www.wapforum.org/docs/copyright.htm, Dec. 13, 2000, pp. 1-13.

W@P Wireless Application Protocol Forum, WAP-120-UACACH-20010413-a, httn://www.wapforum.org/what/copyright.htm, Version 013—Apr. 2001, pp. 1-13.

W@P Wireless Application Protocol Forum, XHTML Mobile Profile, http://wapforum.org/what/copyright.htm, Version 29—Oct. 2001, pp. 1-17.

W@P Wireless Application Protocol Forum, WAP WML WAP-191-WML, http://wapforum.org/what/copyright.thm, Feb. 19, 2000, pp. 1-110.

W@P Wireless Application Protocol Forum, Wireless Markup Language, http://www.wapforum.org/what/copyright.htm, Version 11—Sep. 2001, pp. 1-69.

(56) References Cited

OTHER PUBLICATIONS

OMA Open Mobile Alliance, Wireless Transaction Protocol, Version Aug. 27, 2002, pp. 1-75.
OMA Open Mobile Alliance, Wireless Profiled TCP, Version Mar. 31, 2001, pp. 1-18.
OMA Open Mobile Alliance, Wireless Profiled HTTP, Version Oct. 31, 2001, pp. 1-16.
OMA Open Mobile Alliance, Wireless Datagram Protocol, Version Jun. 14, 2001, pp. 1-75.
Office Action issued in U.S. Appl. No. 13/615,966 on Jun. 4, 2014, 21 pages.

* cited by examiner

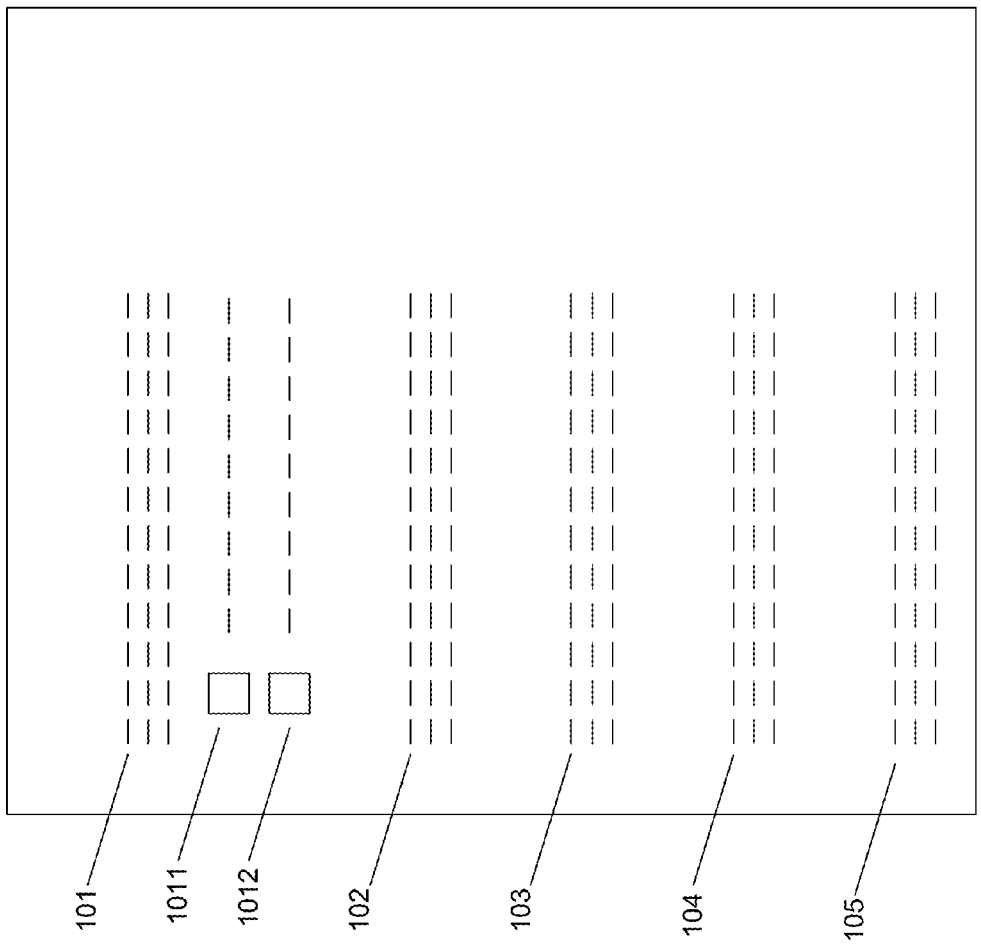

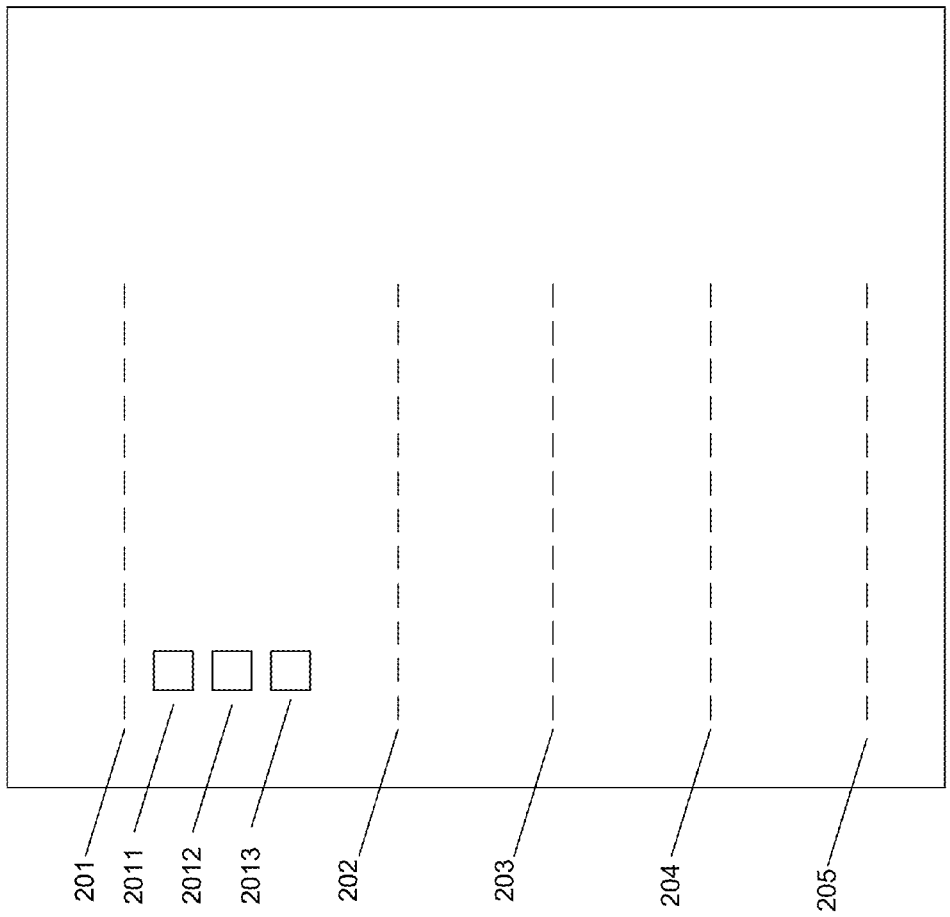

MODIFYING SEARCH RESULTS

RELATED APPLICATIONS

This application claims the benefit under 35 U.S. C. §119 (e) of U.S. Provisional Application No. 61/599,395, filed Feb. 15, 2012, and entitled "Modifying Search Results," the entire disclosure of which is incorporated herein by reference.

BACKGROUND

The subject technology generally relates to information retrieval, and in particular to generating search results.

A search engine results page usually includes a list of search results returned by a search engine in response to a query (e.g., a text or image query). Each search result may include a link to a web page, and a section of the web page showing content from the web page that is responsive to the query.

SUMMARY

The disclosed subject matter relates to generating search results. The method includes receiving a query, obtaining a search result that is responsive to the query, obtaining content from a social networking service that is responsive to the query and related to the search result, modifying the search result to include a first portion associated with the content from the social networking service, providing for display the modified search result and an interface component for receiving a request for interacting with the content, and modifying the search result to include a second portion of the content and to provide an interface to facilitate an interaction in response to receiving a request for interacting with the content.

The disclosed subject matter relates to a non-transitory computer-readable medium that includes instructions. The instructions include code for receiving a query, obtaining a search result that is responsive to the query, issuing a second query to a social networking service to obtain content that is responsive to the query and related to the search result, modifying the search result to include a first portion associated with the content from the social networking service, providing for display the modified search result and an interface component for receiving a request for interacting with the content, and modifying the search result to include a second portion of the content and to provide an interface to facilitate an interaction in response to receiving a request for interacting with the content.

The disclosed subject matter relates to a system that includes a computer. The computer is configured to receive a query, obtain a search result that is responsive to the query, issue a second query to obtain content from a social networking service that is responsive to the query and related to the search result, modify the search result to include a first portion associated with the content from the social networking service, provide for display the modified search result and an interface component for receiving a request for interacting with the content, modify the search result to include a second portion of the content and to provide an interface to facilitate an interaction in response to receiving a request for interacting with the content, and provide for display information received during the interaction together with the modified search result.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIGS. 1A and 1B illustrate examples of search engine results pages with interactive posts.

FIGS. 2A and 2B illustrate examples of search engine results pages with interactive posts.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

Some search engine results pages include annotations of posts from a social networking site. However, to read more details of the posts and interact with the posts, a user may have to leave the search engine results page and log in the social networking site. Therefore, it would be desirable to provide a method and system for integrating posts from a social networking site into search engine results pages and making the posts interactive inline.

Figure 1B:
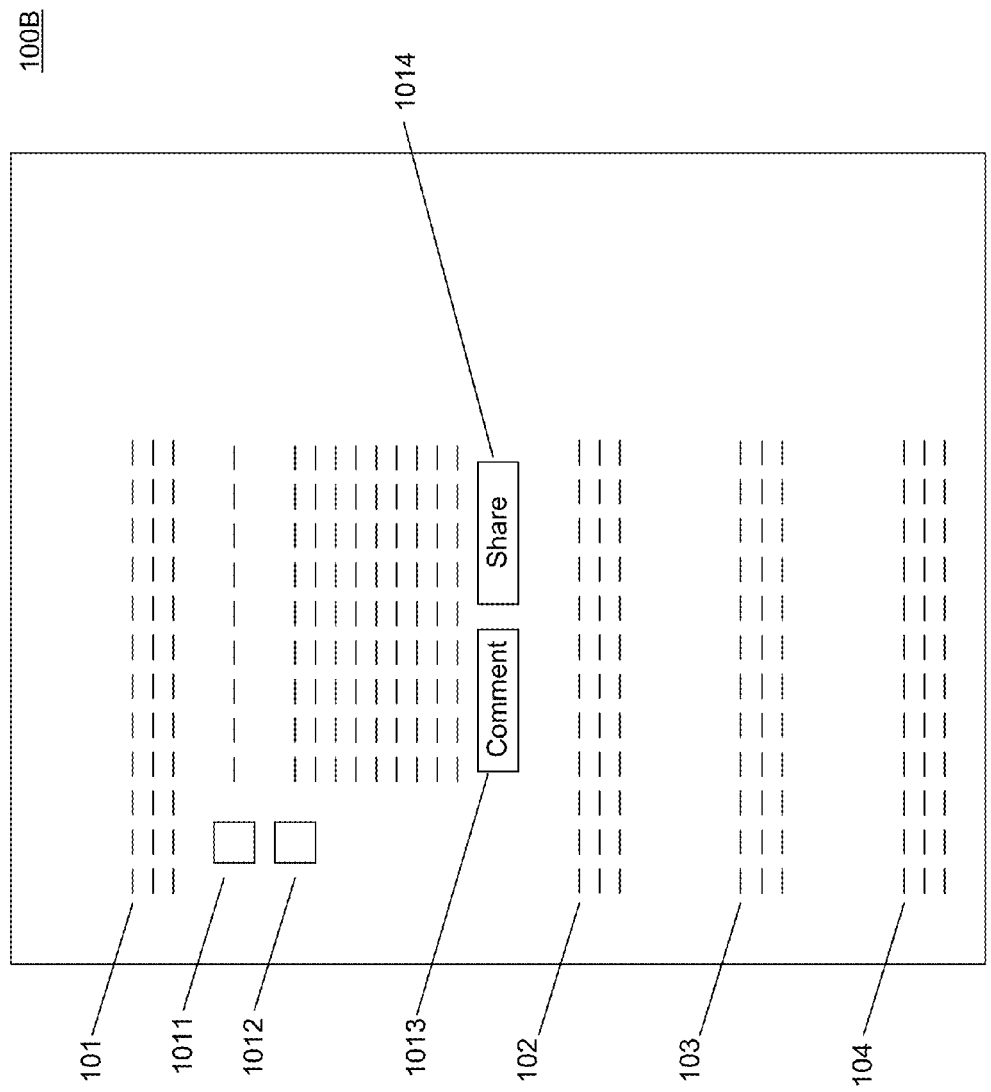

FIG. 1A illustrates an example of a search engine results page 100A with interactive posts. As shown, the search engine results page 100A may include a list of search results 101, 102, 103, 104 and 105 returned by a search engine in response to a query from a user. Each search result may include a link to a web page, and a section of the web page showing where the query has matched content within the web page. Underneath the search result 101, there are post summaries 1011 and 1012 which are related to the search result 101. For example, a post summary may include, but is not limited to, a name or picture of the author of the post, timestamp, visibility of the post (e.g., public or private), and a section of the post. The posts may be from a social networking site, and may be public posts or social posts from the user's contacts in the social networking site. When the user clicks on a post summary, e.g., 1012, the entire post may be displayed inline on the search engine results page 100B, as shown in FIG. 1B, so that the user may interact with the post (e.g., read the post, comment on it or share it) inline on the search engine results page 100B, e.g., instead of leaving the search engine results page and logging in the social networking site to read and share the post. As shown, a "Comment" button 1013 and a "Share" button 1014 may be displayed with the post 1012. Similar graphical components may be used.

Figure 2B:
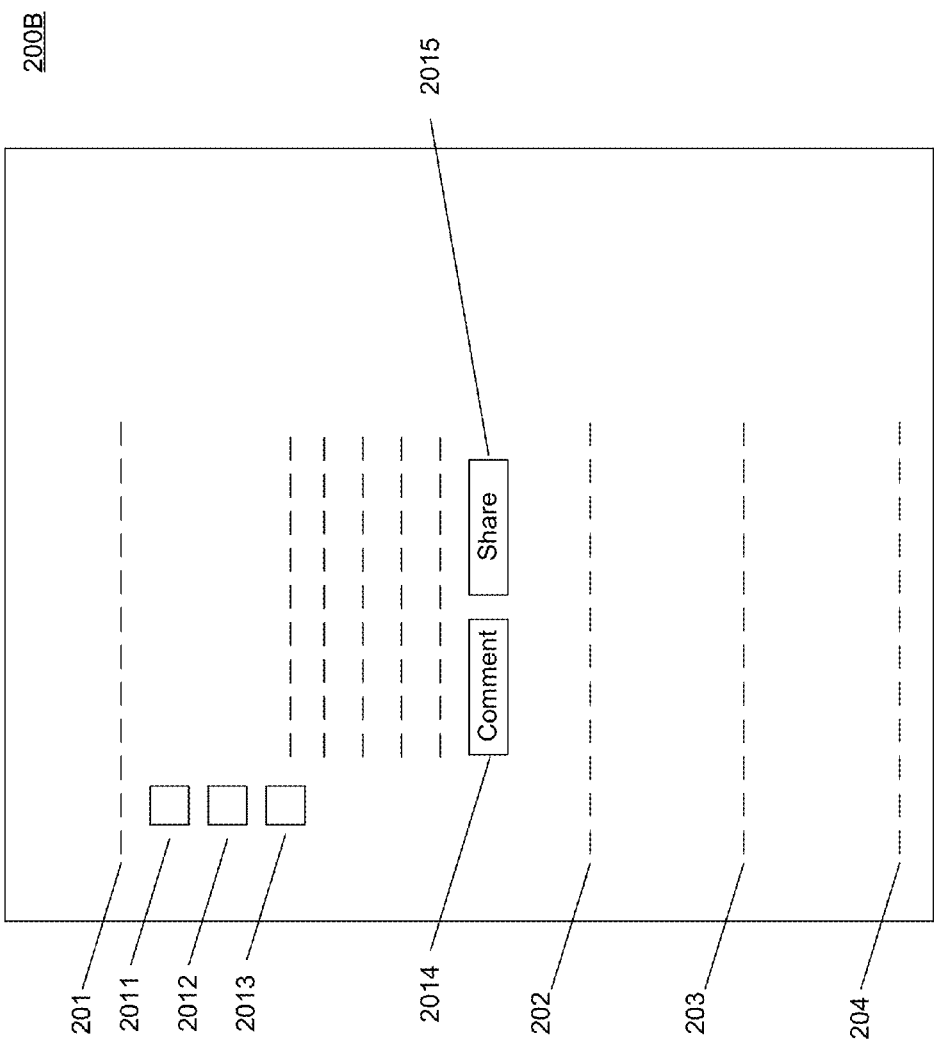

FIG. 2A illustrates an example of a search engine results page 200A with interactive posts. Like the search engine results page 100A, the search engine results page 200A may include a list of search results 201, 202, 203, 204 and 205 returned by a search engine in response to a query, and each search result may include a link to a web page and a section of the web page showing where the query has matched content within the web page. Underneath the search result 201, there are post summaries 2011, 2012 and 2013 which are related to the search result 201. The post summaries 2011, 2012 and 2013 may only include a picture of the author of the post. When a user clicks on a post summary, e.g., the post summary 2013, the entire post may be displayed inline on the search engine results page 200B, as shown in FIG. 2B, so that the user may read the post and interact with it without leaving the search engine results page 200B. As shown, a "Comment" button 2014 and a "Share" button 2015 may be displayed with the post 2013. Similar graphical components may be used.

Figure 3:
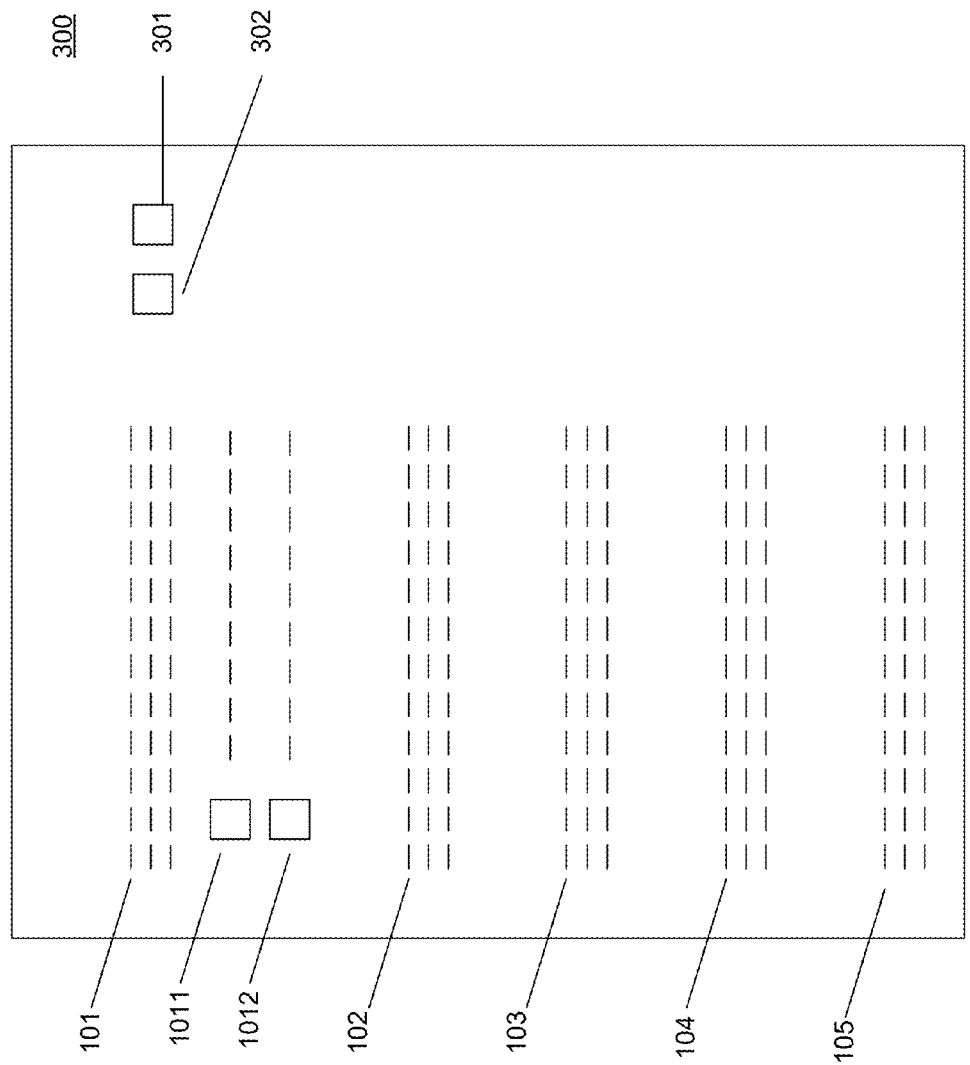
FIG. 3 illustrates an example of a search engine results page with interactive posts.

FIG. 3 illustrates an example of a search engine results page 300 with interactive posts. In addition to the search results and interactive posts on the search engine results page 100A shown in FIG. 1A, the search engine results page 300 may also include expert post summaries 301 and 302 related to the query. When the user clicks on an expert post summary, e.g., 301, the entire expert post may be displayed inline on the search engine results page, so that the user may read the post, comment on it or share it inline on the search engine results page.

Figure 4:
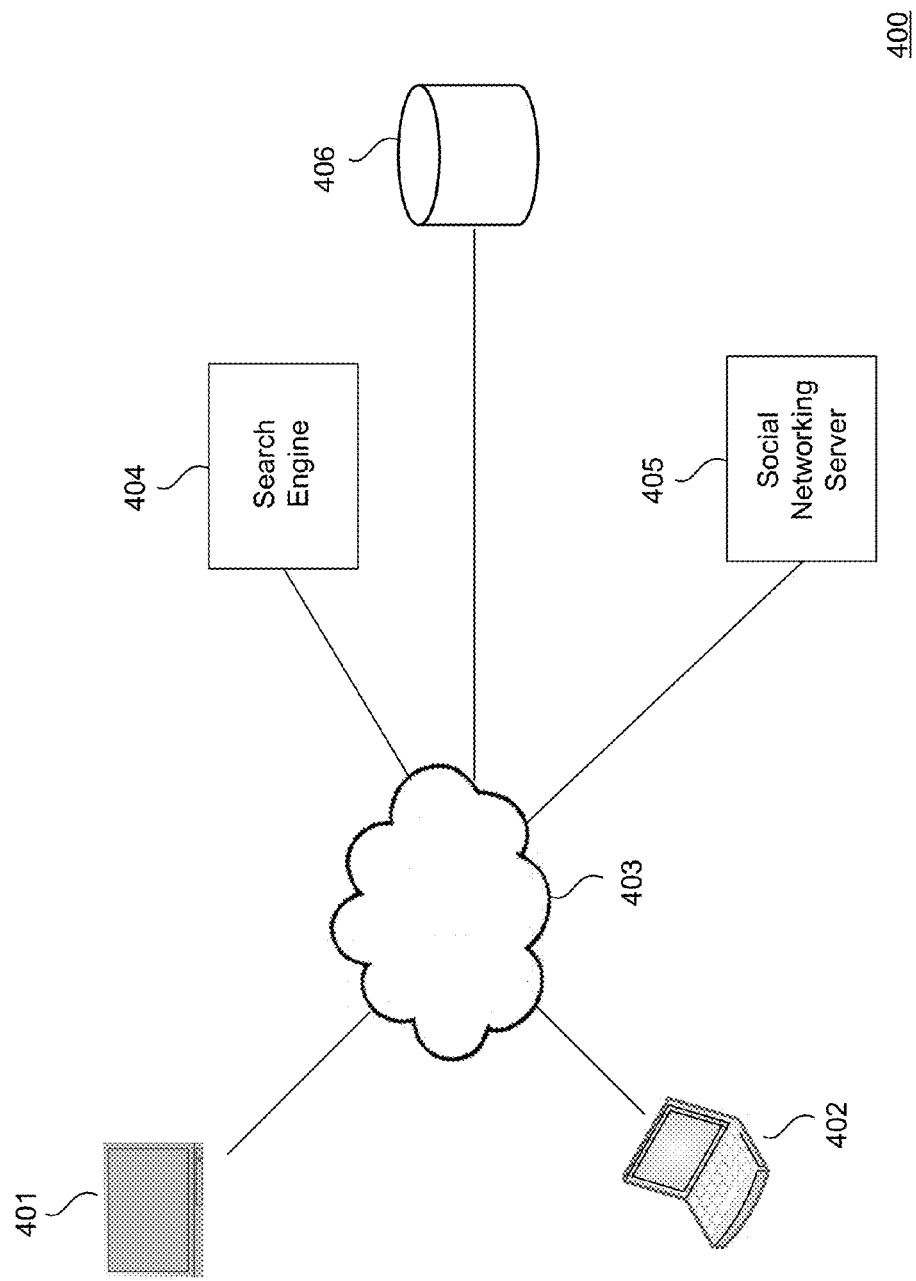
FIG. 4 illustrates a block diagram of an example of a system for providing interactive posts inline on a search engine results page.

FIG. 4 illustrates a block diagram of an example of a system 400 for providing interactive posts inline on a search engine results page. As shown, the system 400 may include a plurality of user devices (e.g., user devices 401 and 402) coupled to a search engine 404 and a social networking server 405 over a network 403. The search engine 404 and the social networking server 405 may be coupled to a storage device 406. The network 403 may include one or more of the Internet, an intranet, a local area network, a cellular network or other networks.

In some implementations, the may be indexed, and information associated with the index can indicate whether an author of a post is an expert on a particular topic.

Figure 5:
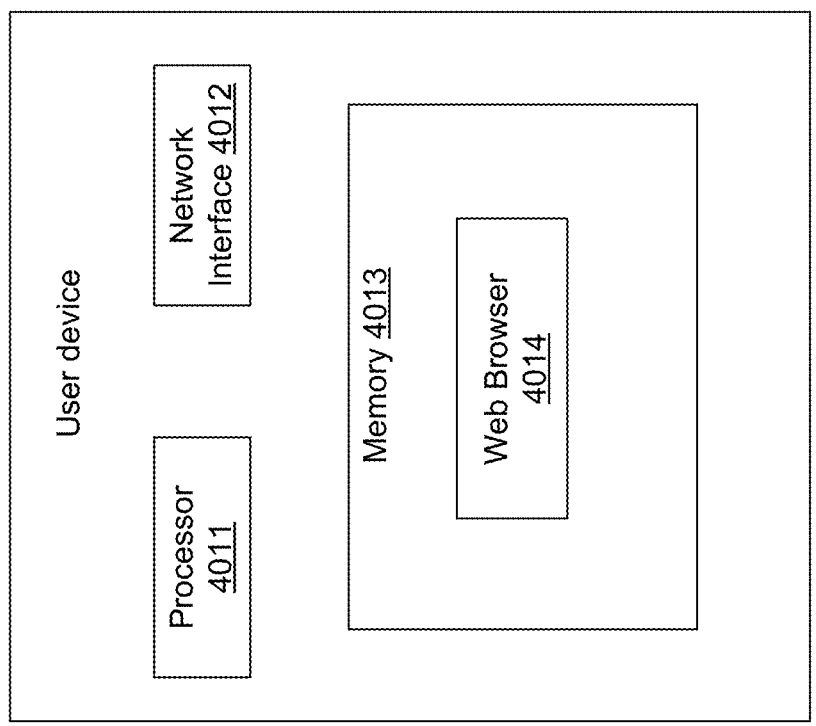
FIG. 5 illustrates a block diagram of an example of a user device shown in FIG. 4.

FIG. 5 illustrates a block diagram of an example of the user device 401 shown in FIG. 4. The user device 401 may be any computing device capable of displaying content, for example, via a web browser or via a specialized application. The user device 401 may be a laptop computer, a desktop computer, a mobile phone, a personal digital assistant (PDA), a tablet computer, a netbook, a physical machine or a virtual machine. Other devices can also implement the functionalities of the user device 401. A user may interact with the search engine 404 and the social networking server 405 at the user device 401.

The user device 401 may include a processor 4011, a network interface 4012 and a memory 4013. The processor 4011 is configured to execute computer instructions that are stored in a computer-readable medium, for example, the memory 4013. The processor 4011 may be a central processing unit (CPU). The network interface 4012 is configured to allow the user device 401 to transmit and receive data in the network 403. The network interface 4012 may include one or more network interface cards (NICs). The memory 4013 stores data and instructions. As illustrated, the memory 4013 may store a web browser 4014. With the web browser 4014, a user may submit a query to a search website (e.g., a search website run by the search engine 404), get a search engine results page in response, click on links on the search engine results page to view the results, and interact inline with posts on the search engine results page. A user may also log in a social networking site (e.g., a social networking site run by the social networking server 405) to create and change social graphs.

Figure 6:
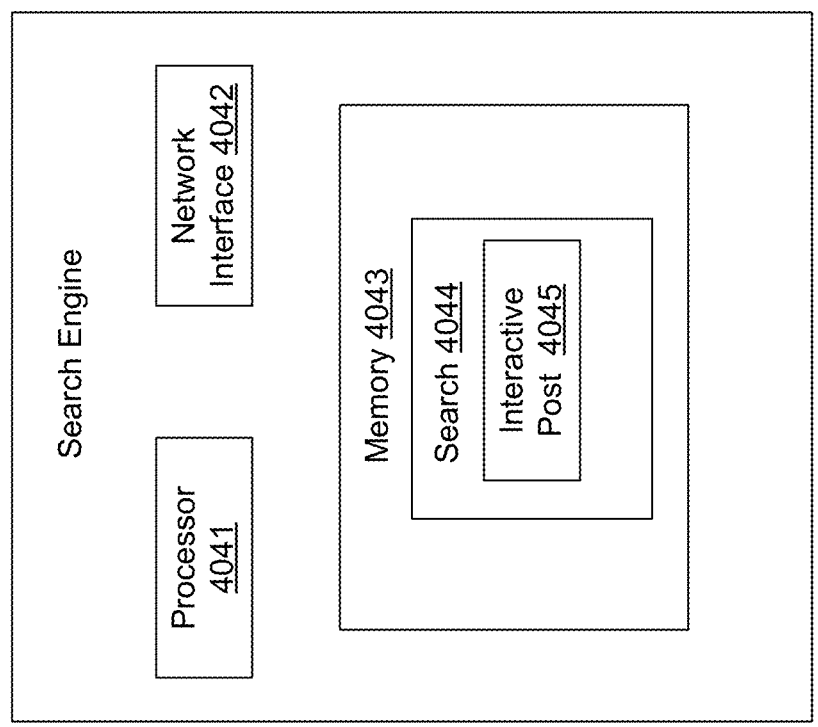
FIG. 6 illustrates a block diagram of an example of the search engine shown in FIG. 4.

FIG. 6 illustrates a block diagram of an example of the search engine 404 shown in FIG. 4. The search engine 404 may be coupled to the user devices (e.g., 401 and 402), the social networking server 405 and the storage device 406 via the network 403. The search engine 404 may include a processor 4041, a network interface 4042, and a memory 4043. The processor 4041 is configured to execute computer instructions that are stored in a computer-readable medium, for example, the memory 4043. The processor 4041 may be a central processing unit (CPU). The network interface 4042 is configured to allow the search engine 404 to transmit and receive data in the network 403. The network interface 4042 may include one or more network interface cards (NICs). The memory 4043 stores data and instructions. As illustrated, the memory 4043 may store a search module 4044. The search module 4044 may further include an interactive post module 4045. The search module 4044 may perform a search in response to a query and generate a search engine results page including interactive posts, e.g., the search engine results pages 100A, 200A, or 300 shown in FIGS. 1A, 2A and 3. If the user clicks on a post summary (e.g., 111, 112, 211, 212, 213, 301 or 302 shown in FIGS. 1A, 2A and 3), the interactive post module 4045 may issue a query to the storage device 406 to access the post, and display it inline on the search engine results page, as shown in FIGS. 1B and 2B. If the user interacts with the post (e.g., by commenting on it), the interactive post module 4045 may store data received during the interaction in the storage device 406, so as to update the social networking site run by the social networking server 405.

Figure 7:
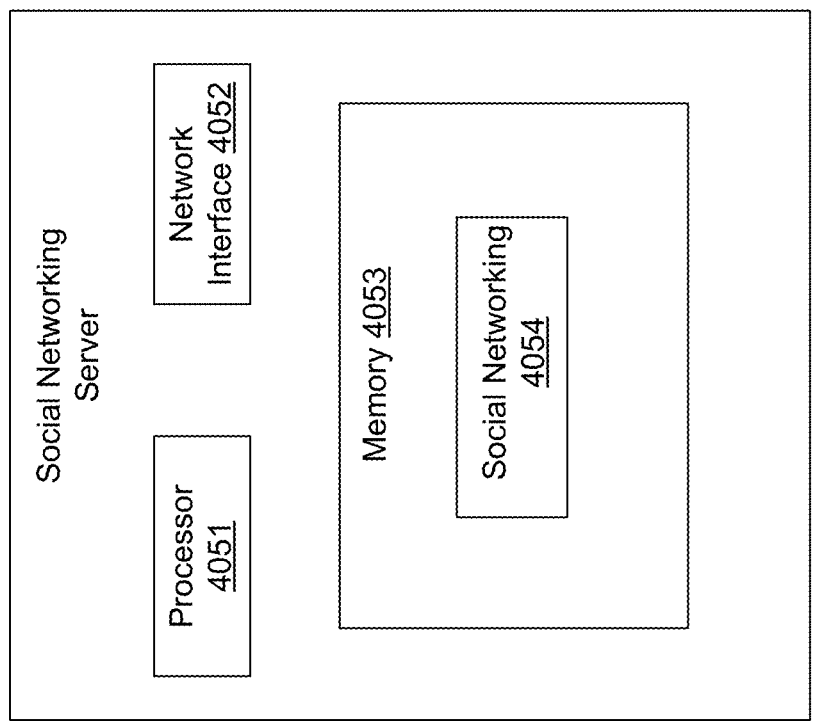
FIG. 7 illustrates a block diagram of an example of the social networking server shown in FIG. 4.

FIG. 7 illustrates a block diagram of an example of the social networking server 405 shown in FIG. 4. The social network server 405 may be coupled to the user devices (e.g., 401 and 402), the search engine 404 and the storage device 406 via the network 403, and may include a processor 4051, a network interface 4052, and a memory 4053. The processor 4051 is configured to execute computer instructions that are stored in a computer-readable medium, for example, the memory 4053. The processor 4051 may be a central processing unit (CPU). The network interface 4052 is configured to allow the social network server 405 to transmit and receive data in the network 403. The network interface 4052 may include one or more network interface cards (NICs). The memory 4053 stores data and instructions. As illustrated, the memory 4053 may store a social networking module 4054 which may provide social networking services to allow users to, e.g., create and change social graphs, add new circles, add a member to a circle, add, reply to, share or comment on posts, and approve or remove tags.

Figure 8:
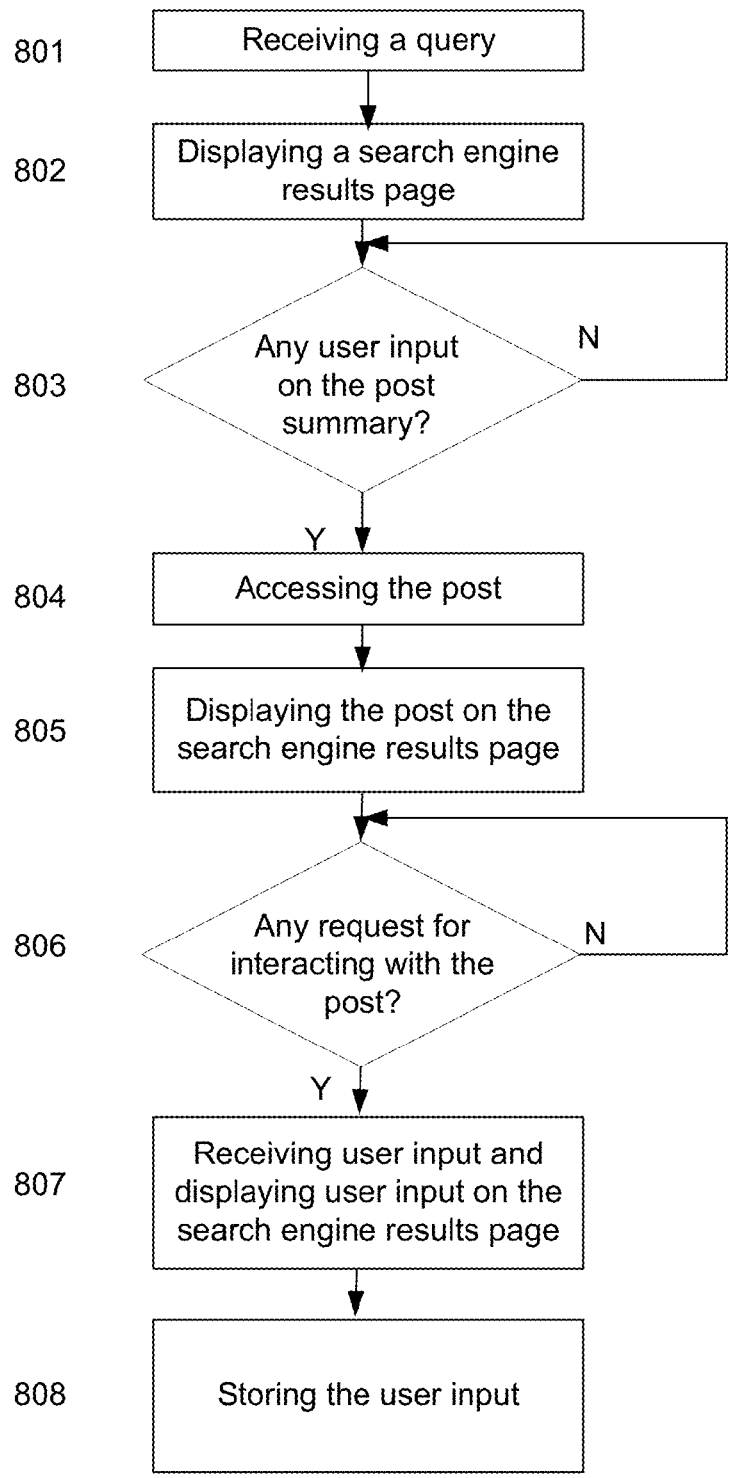
FIG. 8 illustrates a flowchart of an example of a method for providing interactive posts on a search engine results page.

FIG. 8 illustrates a flowchart of an example of a method for providing interactive posts inline on a search engine results page. Although FIG. 8 is described with reference to the configurations of FIG. 4, the process of FIG. 8 is not limited to such configurations and can be applied to other systems and configurations. At 801, a query may be received, e.g., at the search engine 404 from a user. At 802, a search engine results page may be generated, e.g., by the search engine 404. In some implementations, the search engine results page may include one or more post summaries 1011, 1012, 2011, 2012 or 2013, as shown in FIGS. 1A and 2A. The posts may be public posts or social posts from the user's contacts in a social networking site. The post summaries may include a user interface component which may respond to a user input, e.g., a click or a voice command.

In some implementations, the search engine results page may also include one or more expert post summaries, e.g., expert post summaries 301 or 302 shown in FIG. 3. In some implementations, a score may be computed for each author based on a number of factors, e.g., the quality of each of his/her posts, the number of his/her followers, the amount of engagement with his/her posts, and/or the frequency he/she posts, so as to determine whether the author is an expert on a particular topic. In some implementations, only authors with highest scores, e.g., top 100, may be considered and labeled as experts. In some implementations, only posts from experts with the highest scores, e.g., top 5, may be considered as expert posts.

In some implementations, the search engine results page may also include search results from other sources, e.g., web chat and comments on the web.

At 803, it may be determined whether there is a user input on a post summary (e.g., the post summary 1011, 1012, 2011, 2012, 2013, 301 or 302 shown in FIGS. 1A, 2A and 3) on the search engine results page, e.g., a click or a voice command "expand". If not, 803 may be repeated. Otherwise, at 804, the post may be accessed. In some implementations, public posts and social posts from the user's contacts in the social networking site may be accessed. In some implementations, expert posts may be accessed from as well.

At 805, the entire post may be displayed inline on the search engine results page, as shown in FIGS. 1B and 2B. At 806, it may be determined whether there is any request for interacting with the post, e.g., whether the "Comment" or "Share" button in FIGS. 1B and 2B is clicked on. In some implementations, a share box may be displayed on the search engine results page as well, and it may be determined whether there is any interaction with the share box. If not, 806 may be repeated. Otherwise, at 807, an interface may be displayed to receive user input (e.g., comments on the post or an email address to share the post) and the user input may be displayed inline on the search engine results page. At 808, the user input can be used to update the social networking site run by the social networking server 405.

Figure 9:
FIG. 9 illustrates an example of a search engine results page with interactive posts.

FIG. 9 illustrates an example of a search engine results page 900 with an interactive post. As shown, the search engine results page 900 includes a search result 902 returned by a search engine in response to a query from a user. Each search result may include a link to a web page, and a section of the web page showing where the query has matched content within the web page. Search result 902 includes a link to "en.thebook.org/theb/The_league_of_Awesome_Dance" and has an associated excerpt of "The league of Awesome Dance, commonly knows as The LAD, . . . " Underneath the search result 902 is an associated post summary 904 that is related to the search result 902. Post 904 has information about the user who generated the post, a date of the post, and to whom the post is accessible. Additionally, the post summary 904 contains all or part of the post "Happy Halloween and check out our homepage Scribbled today . . . 2011-". When the user clicks on a post summary, e.g., post 904, the entire post may be displayed inline on the search engine results page 900. Although search results page 900 illustrates only one search result 902 and one associated post summary 904, a search results page may display multiple search results and associated post summaries.

Figure 10:
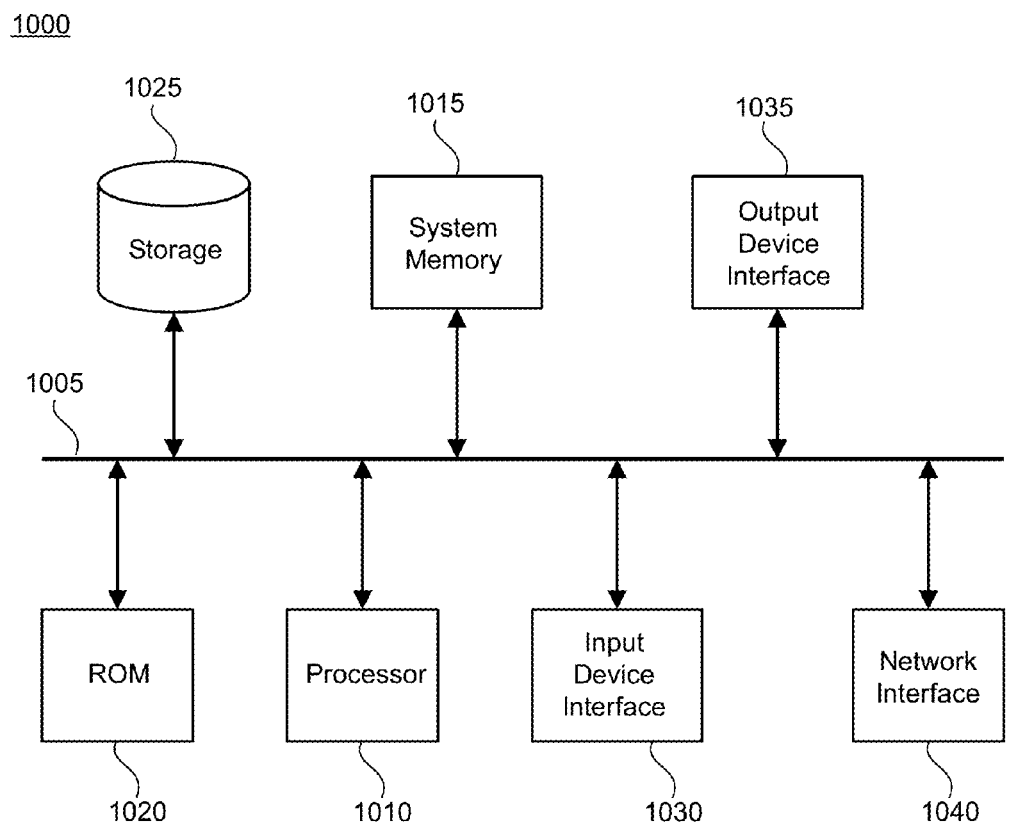
FIG. 10 conceptually illustrates an example electronic system with which some implementations of the subject technology are implemented.

FIG. 10 conceptually illustrates an electronic system 1000 with which some implementations of the subject technology are implemented. For example, one or more of the user devices 401 and 402, the search engine 404 and the social networking server 405 may be implemented using the arrangement of the electronic system 1000. The electronic system 1000 can be a computer (e.g., a mobile phone, PDA), or any other sort of electronic device. Such an electronic system includes various types of computer readable media and interfaces for various other types of computer readable media. Electronic system 1000 includes a bus 1005, processing unit(s) 1010, a system memory 1015, a read-only memory 1020, a permanent storage device 1025, an input device interface 1030, an output device interface 1035, and a network interface 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and data to process in order to execute the processes of the subject technology. The processing unit(s) can be a single processor or a multi-core processor in different implementations.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some implementations of the subject technology use a mass-storage device (for example a magnetic or optical disk and its corresponding disk drive) as the permanent storage device 1025.

Other implementations use a removable storage device (for example a floppy disk, flash drive, and its corresponding disk drive) as the permanent storage device 1025. Like the permanent storage device 1025, the system memory 1015 is a read-and-write memory device. However, unlike storage device 1025, the system memory 1015 is a volatile read-and-write memory, such a random access memory. The system memory 1015 stores some of the instructions and data that the processor needs at runtime. In some implementations, the processes of the subject technology are stored in the system memory 1015, the permanent storage device 1025, or the read-only memory 1020. For example, the various memory units include instructions for providing a search engine results page in accordance with some implementations. From these various memory units, the processing unit(s) 1010 retrieves instructions to execute and data to process in order to execute the processes of some implementations.

The bus 1005 also connects to the input and output device interfaces 1030 and 1035. The input device interface 1030 enables the user to communicate information and select commands to the electronic system. Input devices used with input device interface 1030 include, for example, alphanumeric keyboards and pointing devices (also called "cursor control devices"). Output device interfaces 1035 enables, for example, the display of images generated by the electronic system 1000. Output devices used with output device interface 1035 include, for example, printers and display devices, for example cathode ray tubes (CRT) or liquid crystal displays (LCD). Some implementations include devices for example a touchscreen that functions as both input and output devices.

Finally, as shown in FIG. 10, bus 1005 also couples electronic system 1000 to a network (not shown) through a network interface 1040. In this manner, the electronic system 1000 can be a part of a network of computers (for example a local area network ("LAN"), a wide area network ("WAN"), or an Intranet, or a network of networks, for example the Internet. Any or all components of electronic system 1000 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method executed by one or more processors, the method comprising:
   receiving, by one or more processors, a query;
   obtaining, by one or more processors, a plurality of search results that are responsive to the query;
   obtaining, by one or more processors, content from a social networking service that is responsive to the query and related to a particular search result of the plurality of search results, the content comprising a post published to the social networking service;
   modifying, by one or more processors, the particular search result to provide a revised search result comprising a summary of the post from the social networking service, the summary comprising a portions of the content;
   providing, by one or more processors, for display the revised search result and an interface component, the interface component being provided with the revised search result; and
   receiving, by one or more processors, a request for interacting with the content, the request being provided through the interface component, and in response:
     modifying the revised search result to include all of the content of the post from the social networking service to display the complete post with the particular search result.

2. The method of claim 1, further comprising: receiving the request for interacting with the content and displaying information received during the interaction together with the revised search result.

3. The method of claim 1, wherein the request for interacting with the content comprises viewing the content from the social networking service.

4. The method of claim 1, wherein the request for interacting with the content comprises sharing the content from the social networking service.

5. The method of claim 1, wherein the request for interacting with the content comprises commenting on the content from the social networking service.

6. The method of claim 1, further comprising: displaying information about at least one content from an expert related to the query together with the revised search result.

7. A non-transitory computer-readable medium, the computer-readable medium storing instructions that, when executed by a computer, cause the computer to perform operations comprising:
   receiving a query;
   obtaining a plurality of search results that are responsive to the query;
   obtaining content from a social networking service that is responsive to the query and related to a particular search result of the plurality of search results, the content comprising a post published to the social networking service;
   modifying the particular search result to provide a revised search result comprising a summary of the post from the social networking service, the summary comprising a portions of the content;
   providing for display the revised search result and an interface component, the interface component being provided with the revised search result; and
   receiving a request for interacting with the content, the request being provided through the interface component, and in response:
     modifying the revised search result to include all of the content of the post from the social networking service to display the complete post with the particular search result.

8. The non-transitory computer-readable medium of claim 7, wherein the operations further comprise receiving the request for interacting with the content and display information received during the interaction together with the revised search result.

9. The non-transitory computer-readable medium of claim 7, wherein the request for interacting with the content comprises viewing the content from the social networking service.

10. The non-transitory computer-readable medium of claim 7, wherein the request for interacting with the content comprises sharing the content from the social networking service.

11. The non-transitory computer-readable medium of claim 7, wherein the request for interacting with the content comprises commenting on the content from the social networking service.

12. The non-transitory computer-readable medium of claim 7, wherein the instructions further cause the computer to: display information about at least one content from an expert related to the query together with the revised search result.

13. A system comprising:
one or more processors; and
computer-readable medium, the computer-readable medium storing instructions that, when executed by the one or more processors, cause the one or more processors to perform operations comprising:
receiving a query;
obtaining, by one or more processors, a plurality of search results that are responsive to the query;
obtaining, by one or more processors, content from a social networking service that is responsive to the query and related to a particular search result of the plurality of search results, the content comprising a post published to the social networking service;
modifying, by one or more processors, the particular search result to provide a revised search result comprising a summary of the post from the social networking service, the summary comprising a portions of the content;
providing for display the revised search result and an interface component, the interface component provided with the revised search result; and
receiving a request for interacting with the content, the request being provided through the interface component, and in response:
modifying the revised search result to include all of the content of the post from the social networking service to display the complete post with the particular search result.

14. The system of claim 13, wherein the request for interacting with the content comprises viewing the content from the social networking service.

15. The system of claim 13, wherein the request for interacting with the content comprises sharing the content from the social networking site.

16. The system of claim 13, wherein the request for interacting with the content comprises commenting on the content from the social networking site.

17. The system of claim 13, wherein the computer is further configured to: display information about at least one content from an expert related to the query together with the revised search result.

* * * * *